United States Patent
Jeannin

(10) Patent No.: US 6,783,237 B1
(45) Date of Patent: Aug. 31, 2004

(54) EYEGLASSES HAVING ARTIFICIAL HORIZON THEREON

(76) Inventor: Hubert Jeannin, Clos de Chateau-Vallon, 83190 Ollioules (FR)

( * ) Notice: Subject to any disclaimer, the term of this patent is extended or adjusted under 35 U.S.C. 154(b) by 91 days.

(21) Appl. No.: 10/088,005

(22) PCT Filed: Sep. 15, 2000

(86) PCT No.: PCT/FR00/02568

§ 371 (c)(1),
(2), (4) Date: Jul. 3, 2002

(87) PCT Pub. No.: WO01/22151

PCT Pub. Date: Mar. 29, 2001

(30) Foreign Application Priority Data

Sep. 17, 1999 (FR) .............................................. 99 11855

(51) Int. Cl.[7] .................................................. G02C 1/00
(52) U.S. Cl. .......................................... 351/158; 351/41
(58) Field of Search ............................ 351/158, 41, 51, 351/52

(56) References Cited

U.S. PATENT DOCUMENTS 4,828,355 A * 5/1989 Lipson et al. ................. 351/51
5,161,196 A 11/1992 Ferguson

FOREIGN PATENT DOCUMENTS

EP 0 603 092 6/1994
WO WO 96/25685 8/1996

* cited by examiner

Primary Examiner—Hung X. Dang
(74) Attorney, Agent, or Firm—Harrison & Egbert

(57) ABSTRACT

A sight for locking device for preventing motion sickness, characterized in that it consists of an impermeable, transparent or translucent tubular container closed on itself. There are enclosed at least two substances having different states and/or masses, whereof at least one visible interface physically represents sight markers, when the device is positioned in the peripheral visual field of one eye or both eyes of the user. The invention is particularly and advantageously useful for producing spectacle inhibiting motion sickness.

20 Claims, 3 Drawing Sheets

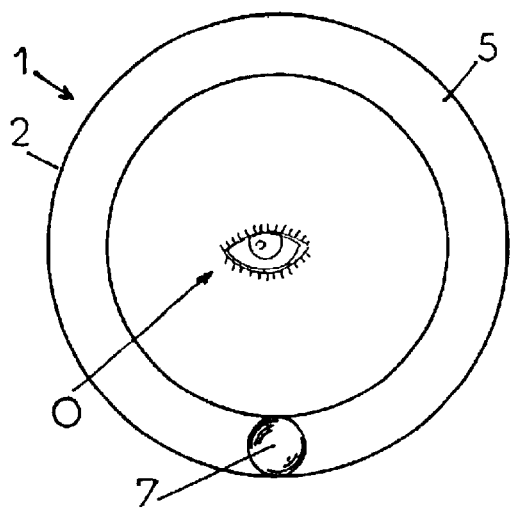
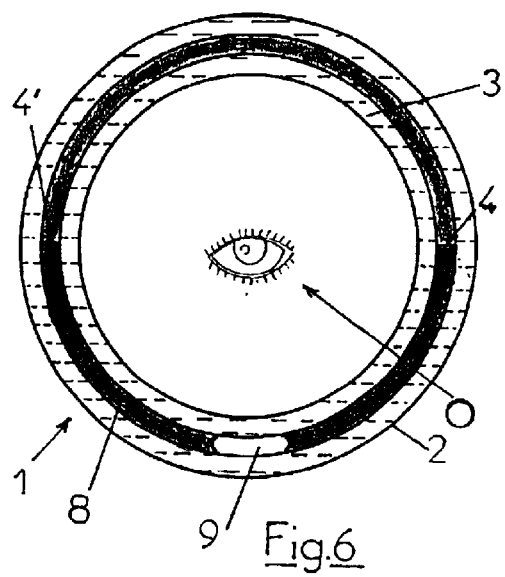
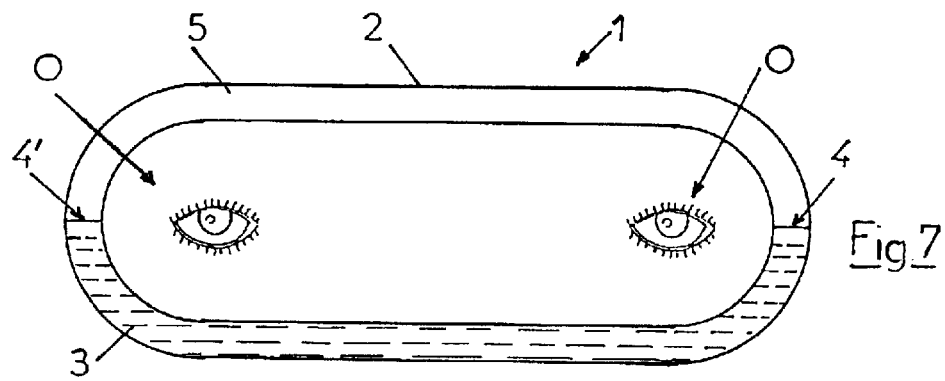
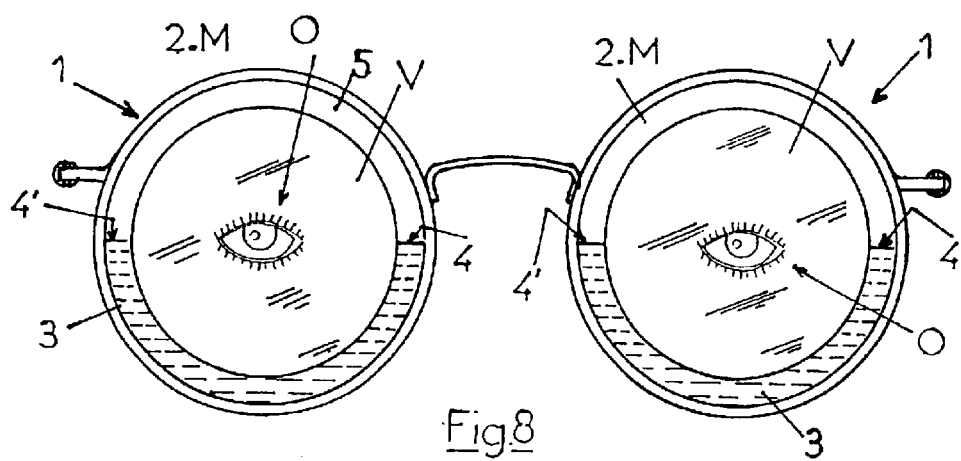

EYEGLASSES HAVING ARTIFICIAL HORIZON THEREON

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention presented here involves a visual balancing device, added onto or integrated into mobile objects, spectacle lenses, spectacle frames, or other supports, in order to provide for the users at least one reference point linked to gravity in their peripheral field of vision, and thus to prevent any inconvenience (loss of attention and nausea, general motion sickness) associated, in particular, with divergent perceptions of balance and sight.

The invention presented here is also aimed at numerous applications of the device in scientific, medical, comfort, leisure, or professional and, in particular, military fields.

BACKGROUND OF THE INVENTION

A difference in perception between sight and balance (the inner ear) occurs when the individual is placed in a moving environment without visually perceiving this movement, and vice-versa. In fact, the eye perceives a stable environment inside of a moving object, for example, inside a cabin of a ship that is moving, whereas the inner ear perceives the opposite information. It feels the ship's movement. This contradiction or difference in perception is the cause of motion sickness (sea sickness, air sickness, car sickness, etc.), also called kinetosis.

Several anti-kinetosis devices are currently available on the market, some of which are the object of patent applications. In the patent number WO 96/25685, for example, it is proposed, in order to act against kinetosis, to wear glasses that are particular in that they contain, on or in their lenses, an artificial horizon made up of a line visible to the user, held in a permanent horizontal position regardless of the lateral movements of the glasses or the of the head of the user. This patent also mentions, as prior art, in particular, the documents U.S. Pat. No. 5,355,182, WO 91/00541, which reveal more or less complex devices that have the major disadvantage, just like the object of the document WO 96/25685, of presenting an artificial horizon line in the center of the individual's field of vision (location of fine perception, and image analysis). This artificial horizon line disrupts the visual acuteness of the user. This disruption does not encourage the systematic wearing of these glasses and moreover, their wearing as a preventive measure. This disruption is eliminated in the system described in the document EP 0,603,092 which allows the display of an artificial horizon in a zone called the "peripheral vision" in order to act against the spatial disorientations of pilots. This complex device mounted on the helmets of pilots is designed for very specific applications, in a manner so that it can not be permanently worn by all persons, and it causes other disadvantages that add to the ones of the current devices mentioned above.

The devices currently available foray persons, due to the fact of their complexity, are expensive, fragile, and possibly heavy (presence of several lenses or pistons at the level of the frames, etc.) and unaesthetic. They do not hold up well under the sizeable variations of temperature and pressure as well as under poor treatment by the user.

In addition, in these devices, the mobility of the artificial horizon line present in the individual's central field of vision is obtained solely by axial rotation, only the lateral swinging movements to the left or to the right (swaying) of the head or of the moving object are manifested in a more or less sizeable slope of this artificial horizon line inside the glasses without the anterior-posterior movements (pitching) movements, which correspond in particular to the backwards and forwards swinging or up and down swinging of the head, for example.

BRIEF SUMMARY OF THE INVENTION

The purpose of the present invention is to correct the disadvantages of the anti-kinetosis devices mentioned above.

According to the invention, this purpose is achieved by a visual balancing device that is added on or integrated to any support that must be positioned in the individual's peripheral field of vision, noteworthy in that it is made of a tube or pipe or any other container having the same principle closed on itself, impermeable, transparent or translucent, having a deflection or not, in which at least two substances are contained which are in different states and/or masses (for example, the one being in liquid form and the other in solid form (stained water and air)), such that the interfaces between these substances mark visible reference points.

These reference points steady the user's sight in agreement with the levels of the liquid of the inner ear. The visual balancing device is integrated or fixed to any support or another device, in a manner such that at least one of these reference points is positioned in the peripheral field of vision of one or both eyes of the user or even of the lenses of photographic devices, cameras, computer screens, or magnifying optical systems.

This positioning is made possible by any known mechanism in itself, and particularly by integrating or fixing this device to the inside or the outside of frames of glasses (with or without lenses), as well as inside or outside at least one of the lenses of the glasses, or diving masks, for example, or lenses of photographic devices, cameras, or magnifying optical systems, or various screens.

Due to the peripheral localization of the reference points or balances of the device, relative to the central field of vision, the individual is not disturbed in his perception of the central image when he uses the device.

In addition, the role of the peripheral field of vision and the functioning mode of the inner ear are recalled for purposes of supplemental information. On the one hand, the peripheral vision is the location surrounding the central image (the "desired" image), the warning area of the central field of vision; on the other hand, the method of locating by the levels of the liquid in the preferred embodiment functions in manner that is fundamentally comparable to that of the inner ear; and thus, the use of the peripheral field of vision and locating by levels have all the ergonomic advantages of being easy to adapt.

In fact, the variation of the level of the substances contained in the device according to the invention (and thus of their interfaces) follows the movement of the head or of the moving object and thus corresponds to the variation of the levels of the liquid of the inner ear. The eye's perception is steadied at all times by these reference points or interfaces as in the inner ear. With the positioning of this balancing device around or on the side of at least one eye, the perception differential is reduced by the arrangement at the best place in the field of vision, with the same type of information as that of the inner ear.

According to a preferred adaptation of the device of the invention, the tube closed on itself assumes the general shape of a ring or of a torus inserted or integrated into a lens or a frame with or without a lens, or even affixed by gluing or "clipping", for example.

According to a preferred embodiment of the invention, at least one of the two substances that it contains is liquid in such a way that its functioning is fundamentally comparable to that of the inner ear.

According to the most simple embodiment of the device of the invention, the tube is filled with a preferably stained liquid, and contains, as a second substance, an air bubble, or other gas, or simply a ball with or without liquid. The ball or the bubble moves as a function of the swaying movements.

According to another embodiment of the device according to the invention, various substances having different appearances, not miscible among themselves, are contained in the tube that is closed onto itself. The reference points are made by the visible interfaces of these substances.

The assembly of the device for visual balancing can be entirely placed either above one or both eyes, for example, in a visor of a hat, or below or even on the side of the eyes, in a blinder, for example. A part of the device can be concealed allowing a single balance point to appear, in order to have the advantage of easier locating.

According to an advantageous adaptation of the device of the invention, the tube that is closed on itself having a general shape of a hollow torus, has, in addition, a communicating deflection, arranged to form an angle relative to the initial plane (plane containing the base unit, preferably in a ring, of the visual balancing device according to the invention). This deflection makes it possible to arrange a reference point in the third dimension. In fact, the interface (s) present in this modification or deflection thus move(s) as a supplement according to the "anterior-posterior" movements or pitching of the individual's head or of the moving object.

According to another embodiment of the device of the invention, the rotating image is made in the general form of a weighted ring turning in another ring.

According to another embodiment of the device of the invention, the considerably enlarged mobile image is comprised of one or more columns connected to each other in the inside space of the moving object and containing various substances whose interfaces provide the visual reference points.

Due to the simplicity of the design of the device of the invention, its manufacturing cost is reduced. It is accessible to all persons.

BRIEF DESCRIPTION OF THE SEVERAL VIEWS OF THE DRAWINGS

The goals, characteristics, and advantages above, and even others, are best exhibited in the description that follows and attached drawings in which:

FIG. 5 is a front and sectional view of the visual balancing device of the invention made according to a fourth simplified embodiment mode.

FIG. 6 is a front and sectional view of the visual balancing device of the invention made according to a fifth embodiment mode.

FIG. 7 is a front and sectional view of the visual balancing device of the invention made according to a sixth embodiment mode.

FIG. 8 is a front and sectional view, having a schematic nature, of a pair of glasses whose frame consists of two visual balancing devices of the invention.

Reference is made to the drawings in order to describe the advantageous embodiment forms, though in no way restrictive, of the visual balancing device according to the invention.

DETAILED DESCRIPTION OF THE INVENTION

The device 1 according to the invention consists of a tube 2 made of any suitable materials having the qualities of sturdiness and, possibly, adequate flexibility, whereby these materials must be transparent or at the very least translucent, the tube whose ends are connected together in order to form a closed "interior" loop. This tube 2 is, for example, made of a plastic rigid or semi-rigid material, or of glass. This tube 2 closes on itself in order to assume various general shapes, for example, circular, ellipsoidal, rectangular shapes, etc. The characteristics of the material(s) used must allow it to contain, depending on the case, substances in various physical states, i.e. liquid, solid or gaseous. At least two substances 3 and 5 of different state and/or mass are contained in the tube 2, closed on itself, where these substances are not miscible among themselves.

Figure 1:
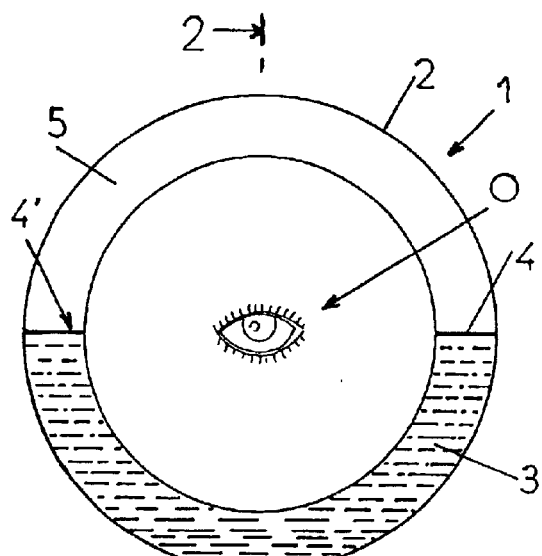
FIG. 1 is a front view and a sectional view, of a first concrete example, of the visual balancing device according to the invention, made according to a very simple embodiment mode, the layout in fine lines shows the placement of the eye relative to this device.
Figure 2:
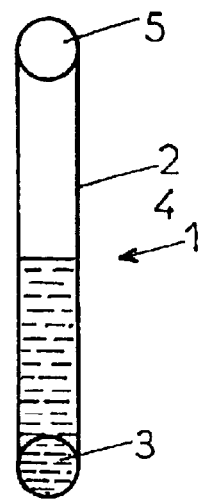
FIG. 2 is a sectional view along the line 2—2 of FIG. 1.

According to the simplified embodiment example shown in FIGS. 1 and 2, the circular tube is filled up to the mid-height, with a stained liquid 3 such as colored water, for example, while the inside upper volume of this tube is filled with a gas 5 such as air. The interfaces 4, 4' of the gaseous fluids 5 and the liquid 3 are clearly visible. These interfaces 4, 4' play the role of visual balancing points which, when the device is placed in front of the eye, maintain a stable position and are in phase with the liquid of the inner ear and reflect its movements.

The volume of gas contained in the toroid tube can be limited to a single bubble (FIG. 4) that stays located in the upper part of the device regardless of the movements of the device around its center.

One of the substances contained in the toroid tube can consist of a solid body, having, for example, a spherical shape 7 (ball) that can be moved in the tube 2; such an embodiment mode is shown in FIG. 5.

Figure 3:
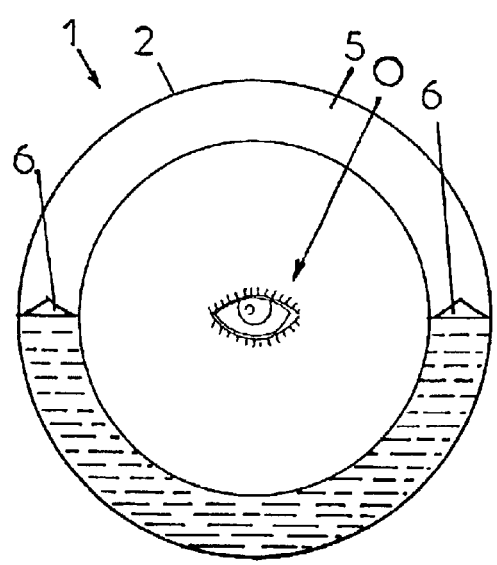
FIG. 3 is a front and sectional view of the visual balancing device made according to a second simplified embodiment mode.
Figure 4:
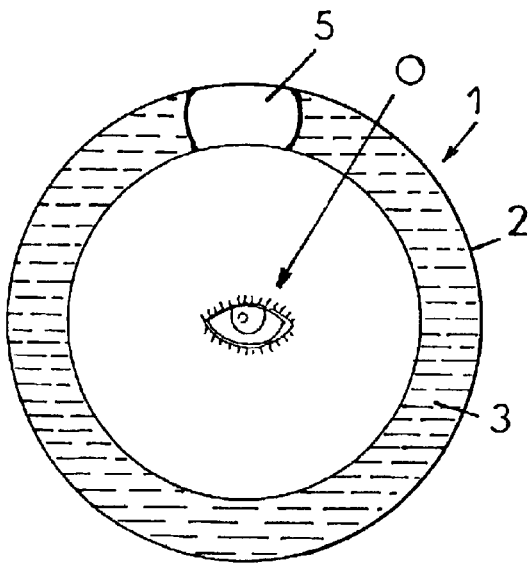
FIG. 4 is a front and sectional view of the visual balancing device made according to a third simplified embodiment mode.

Depending on the relative mass of these substances present and their quantity, the reference points 4, 4' are positioned in the peripheral field, either in the upper part of the tube 2 that is closed on itself, as shown in FIG. 4, or in the lower part, as shown in FIG. 5, or in the middle part as shown in FIGS. 1, 2, and 3, all of the intermediate positions also being possible. For example, the liquid or fluid 3 can occupy approximately half of the space inside the tube 2, as shown in FIGS. 1 to 3, in a manner such that the interfaces 4, 4' with the air or the liquid 3 are located (when it is placed around the individual's eye in a "stable" position), in the state of rest, at mid-height of the ring 2, or in other words, at the horizontal position of the eye in the median peripheral field.

In order to allow a better view of the non-miscible liquid/gas or liquid/liquid interfaces, a small floating object or reference point 6, 6' can be placed at the level of these interfaces (FIG. 3), these small floating reference points surfacing or submerging at the level of these interfaces.

According to another example of the implementation of the invention (not shown), the tube 1 is filled with two liquids that can not be mixed together (because of different density) and, preferably, having a different color, for example, in an equivalent proportion or almost equivalent. The visual reference points for the peripheral vision are marked by the two boundary zones between the two liquids. According to the proportions of the liquids contained in the ring, their interfaces are closer or further apart:

According to another embodiment example of the device of the invention shown in FIG. 6, a floating solid consisting of a circular ring or of a circular annular portion 8 equipped with a weight 9 is housed in the toroid tube 1 filled with liquid 3. In the first case, the ring 8 has two different colored portions and the weight 9 is arranged in the median part of one of these portions, while in the second case, the weight 9 is arranged in the median part of the floating body in the form of the semi-toroid 8, or another annular section.

According to another embodiment mode shown in FIG. 7, the tube 2 has a roughly ellipsoid shape, and it is dimensioned so that it can be placed in the peripheral field of vision of both eyes of a person, in being connected to or incorporated in any adequate support (frames, diving masks, etc.).

The visual balancing device according to the invention, shown in FIGS. 1 to 6, in order to be functional, can be positioned in the peripheral field of vision of the eye O, or the two eyes, by any support mechanism, for example, by gluing on the frames of a pair of glasses (on which lenses may or may not be mounted), having at least one reference point 4, 4' or 6, 6', in the eye's peripheral field of vision. This device in the form of a ring has the advantage of easily being inserted into a frame for glasses. It can be integrated into a frame, or even comprise it. A pair of glasses consisting of a couple of visual balancing devices 1 according to the invention, is shown in a schematic manner in FIG. 8. According to this embodiment mode, the toroid tubes 2 of the devices constitute the frames M of the lenses V of the glasses which, however, might not be equipped with optical lenses, as indicated above, taking into account the specific function of the device of the invention.

A more complex system can be devised (not shown) with two annular devices connected to each other at their top and at their base and to which the arms would be added in order to constitute an original and attractive glasses frame.

Figure 9:
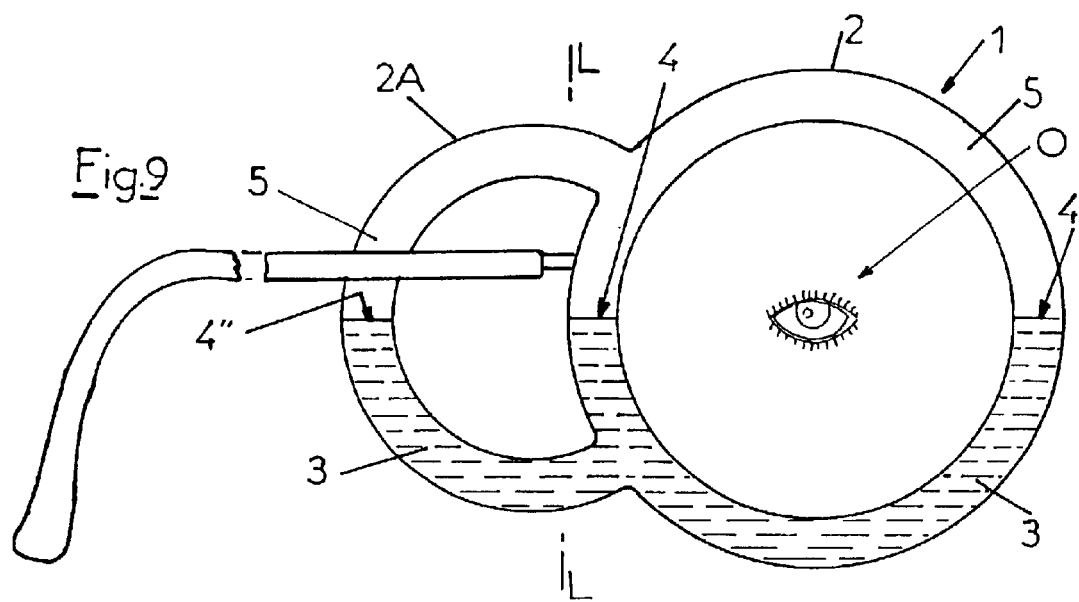
FIG. 9 is a flat view, having a schematic nature and in a section, of a visual balancing device made according to a first development of the invention.

According to another arrangement characteristic of the invention shown in FIG. 9, the tube 2 has a general rounded shape, or even has, in addition, laterally, a deflection 2A bent at an angle in communication with the inside space of the remaining part of the visual balancing device, this deflection 2A forming or able to form a right angle or an obtuse angle close to a right angle, with the ring 2, during the use of the device. The fluid substance 3 incorporated in the tube 2 and in the deflection 2A then has, with the second substance (whose physical state is either identical and has a mass/density different or different physical state), three interfaces. Three vision reference points 4, 4', 4" are then available to steady the user's eye. Two vision reference points 4, 4' are visible on the front part 2 of the device, while a third reference point 4" is visible on the deflection 2A which is in communication with the upper part and with the lower part of this front part.

By this deflection, the device according to the invention provides, in its usage position, a third reference point 4" in the peripheral field of vision outside of the eye and whose variation in level then reproduces the anterior-posterior movements. These three reference points specify and inform the eye about the positioning in three dimensions of the levels of the liquid present in the inner ear. This information thus has the advantage of informing the eye when it is "at verticality in the anterior/posterior direction".

When the device is made in the form of glasses, the deflections 2A comprise the rear portions of the arms of the glasses, and the line L—L includes the placement of the angle that forms the deflections with the remaining front part of the frame.

As shown above, it is easily understood that the user's eye, equipped with this device, steadies his vision using the reference points of this device which move in harmony with the liquid of the inner ear. The individual adapts his vision to the perception of the inner ear and is then no longer subject to inconveniences due to kinetosis.

The applications of this device according to the invention are numerous and multiple, for example, in the military, medical, professional, comfort, and leisure fields. The visual balancing device can be integrated or added onto glasses, to a visor, to a hat, to a blinder, to an optical device, to a diving mask or to a wetsuit, to a photographic device, to a camera, or to a screen.

Figure 10:
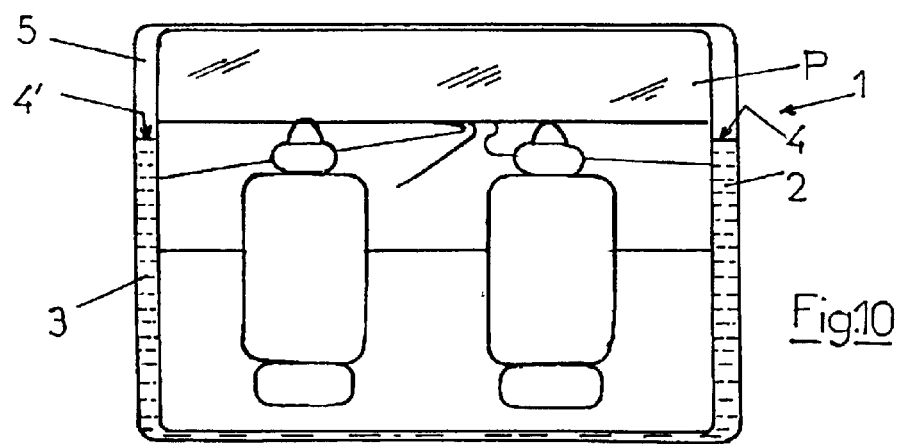
FIG. 10 shows another interesting application of the invention.

It can be arranged near, onto or around the on-board objects such as, for example, a book cover, a console, a computer screen, or even arranged in a space occupied by the passengers or any moving objects transporting one or more persons on land, by air, or by sea, in a manner so as to be visible to them in the best possible conditions. For example, FIG. 10 shows the visual balancing device 1, according to the invention, installed around the upper edge and the sides of the windshield P of a land vehicle.

Figure 11:
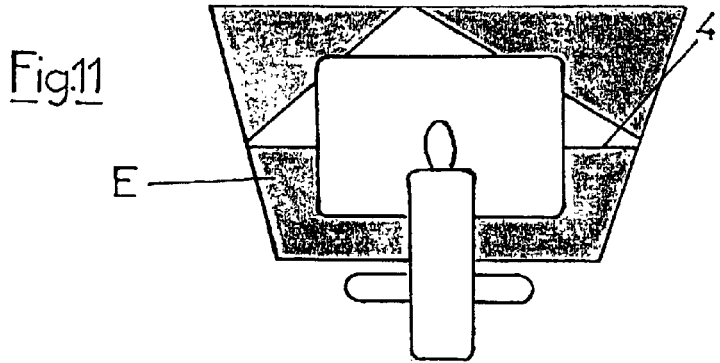
FIG. 11 shows another advantageous development example of the invention.

According to another interesting development of the invention, the visual balancing device can be manifested in a virtual or luminous image of the same type, projected or integrated into a lens of glasses, frame, book cover, console, screen, etc., obtained by means of an electronic device consisting of, for example, a sensor (gyroscope or any other source of information or sensor of the environmental or mobile position) making it possible to detect the variations of the position relative to gravitation. The information, possibly after handling by a computer, is then made available to the eye or eyes by an imaging or lighting system, for example, in the form of an inside or outside perimeter of a screen, or in the form of an animation in one or more screens, wall-mounted or not, or columns, or even in the form of a lighting system, for example, by light beams, or even in the manner of column or display E using glass bulbs or light-emitting diodes (FIG. 11).

What is claimed is:

1. An anti-kinetosis visual balancing device comprising:
   an impermeable tubular container closed on itself, said tubular container being transparent or translucent; and
   at least two substances contained within said tubular container in different states or masses in which at least one visible interface marks lateral vision reference points arranged so as to be in a peripheral field of vision of an eye of a user of the device such that the user can visually perceive a situation corresponding to a situation perceived by semi-circular canals of an inner ear of the user.

2. The device of claim 1, at least one of the substances being a liquid.

3. The device of claim 2, another of the substance being a gaseous fluid.

4. The device of claim 3, said gaseous fluid being air.

5. The device of claim 1, the substances being immiscible liquids.

6. The device of claim 3, a volume of said liquid being equal to a volume of said gaseous fluid.

7. The device of claim 5, each of said immiscible liquids being of equal volumes to each other.

8. The device of claim 3, said gaseous fluid being a single bubble.

9. The device of claim 1, at least one of the substances being stained or colored.

10. The device of claim 2, the substances having an interface therebetween, said interface being a floating or submerged reference point.

11. The device of claim 2, another of the substances being a floating solid material, said floating solid material being a circular ring equipped with a weight.

12. The device of claim 2, another of the substances being a floating solid material, said floating solid material being a circular portion of a ring equipped with a weight.

13. The device of claim 1, one of the substances being a ball of solid material displaceable with said tubular container.

14. The device of claim 1, further comprising:
    an eyeglass frame having said tubular container affixed thereto, said tubular container having a ring shape.

15. The device of claim 1, further comprising:
    an eyeglass frame;
    at least one lens affixed to said eyeglass frame, and tubular container being of a ring shape affixed to the lens.

16. The device of claim 1, said tubular container having at least one deflection formed in a front portion thereof, the deflection communicating with an inside space of said front portion such that the substances can circulate therein.

17. The device of claim 1, further comprising:
    another impermeable tubular container closed on itself and connected to said tubular container, said another impermeable tubular container having at least two substances therein of different states or masses.

18. The device of claim 1, further comprising:
    a support device onto which said tubular container is integrated or affixed thereto, said support device selected from the group consisting of glasses, a visor, a hat, a blinder, an optical device, a diving mask, a wetsuit, a photographic device, a camera and a screen.

19. The device of claim 1, further comprising:
    a vehicle onto which said tubular container is affixed, said tubular container positioned so as to be visable to a passenger of the vehicle.

20. The device of claim 1, further comprising:
    sensor means cooperative with said tubular container, said sensor means for projecting a virtual or luminous image onto articles so as to produce an anti-kinetosis effect; and
    a processsing means connected to said sensor means for detecting variation of a position relative to gravitation so as to form luminous reference points within the field of vision of the user.

* * * * *